May 2, 1939.  J. A. WALLER  2,156,645
CULINARY DEVICE
Filed July 24, 1937  3 Sheets-Sheet 1
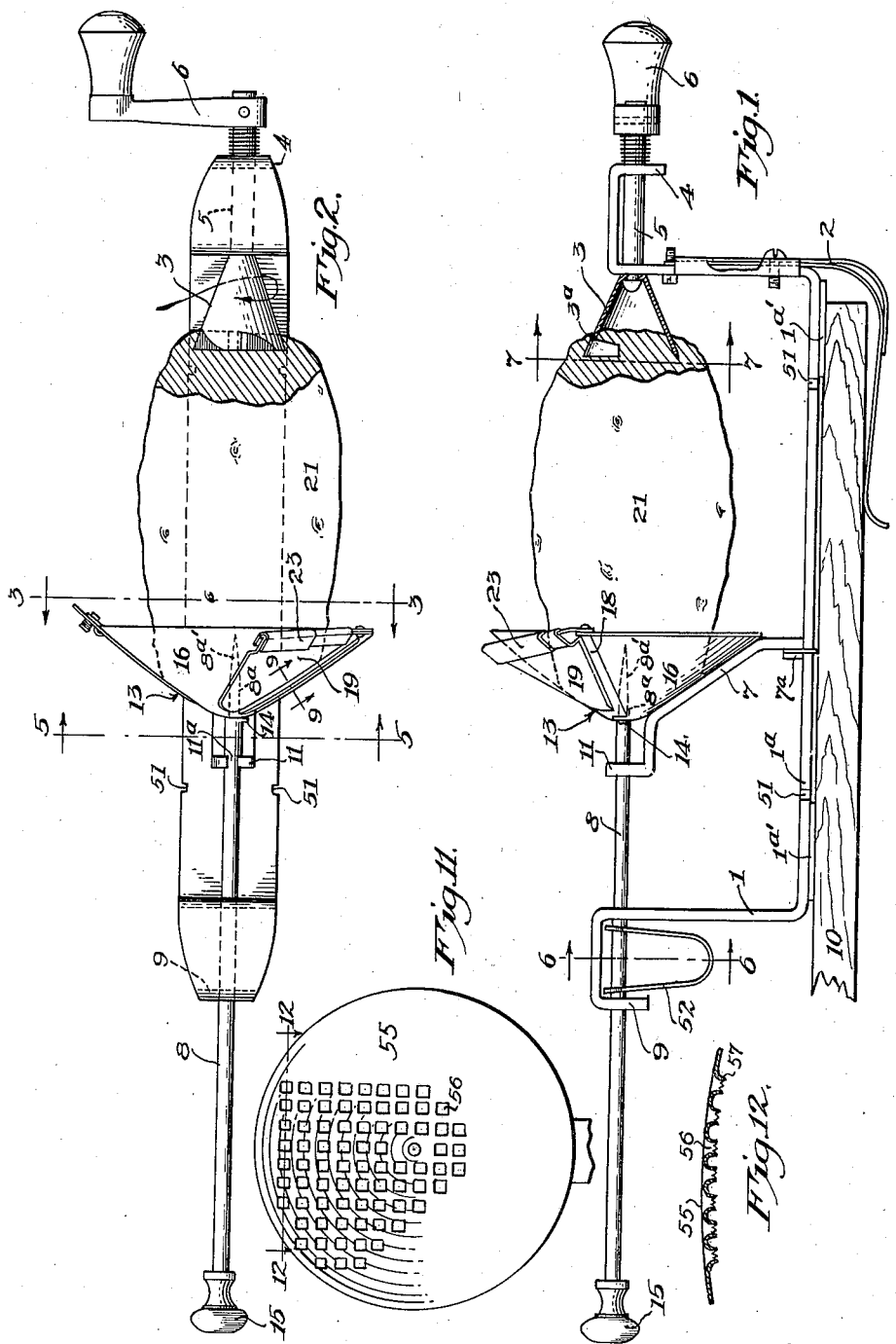
INVENTOR.
John A. Waller,
BY Arthur P. Knight & Alfred W. Knight
ATTORNEYS.

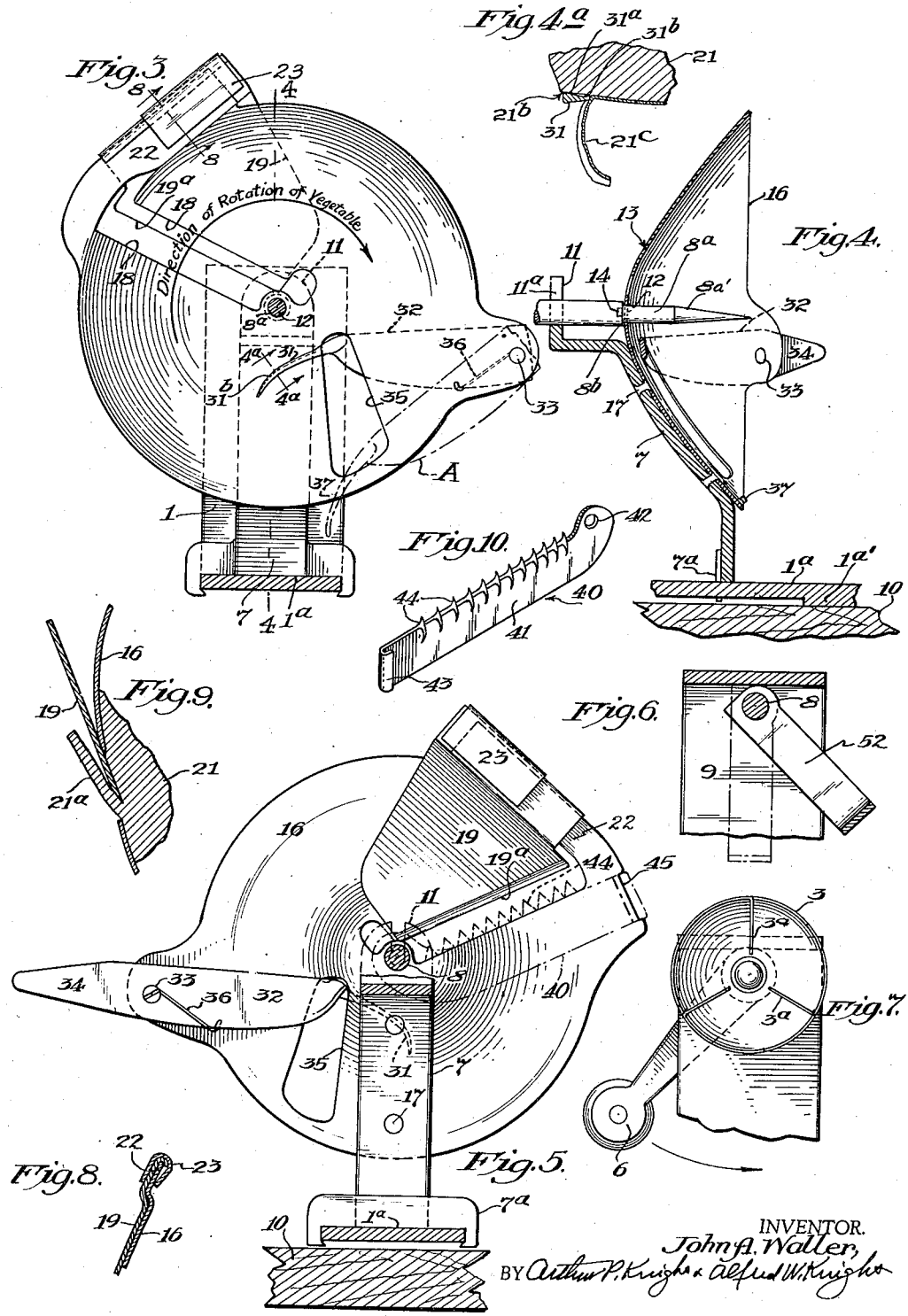

May 2, 1939. J. A. WALLER 2,156,645
CULINARY DEVICE
Filed July 24, 1937 3 Sheets-Sheet 3
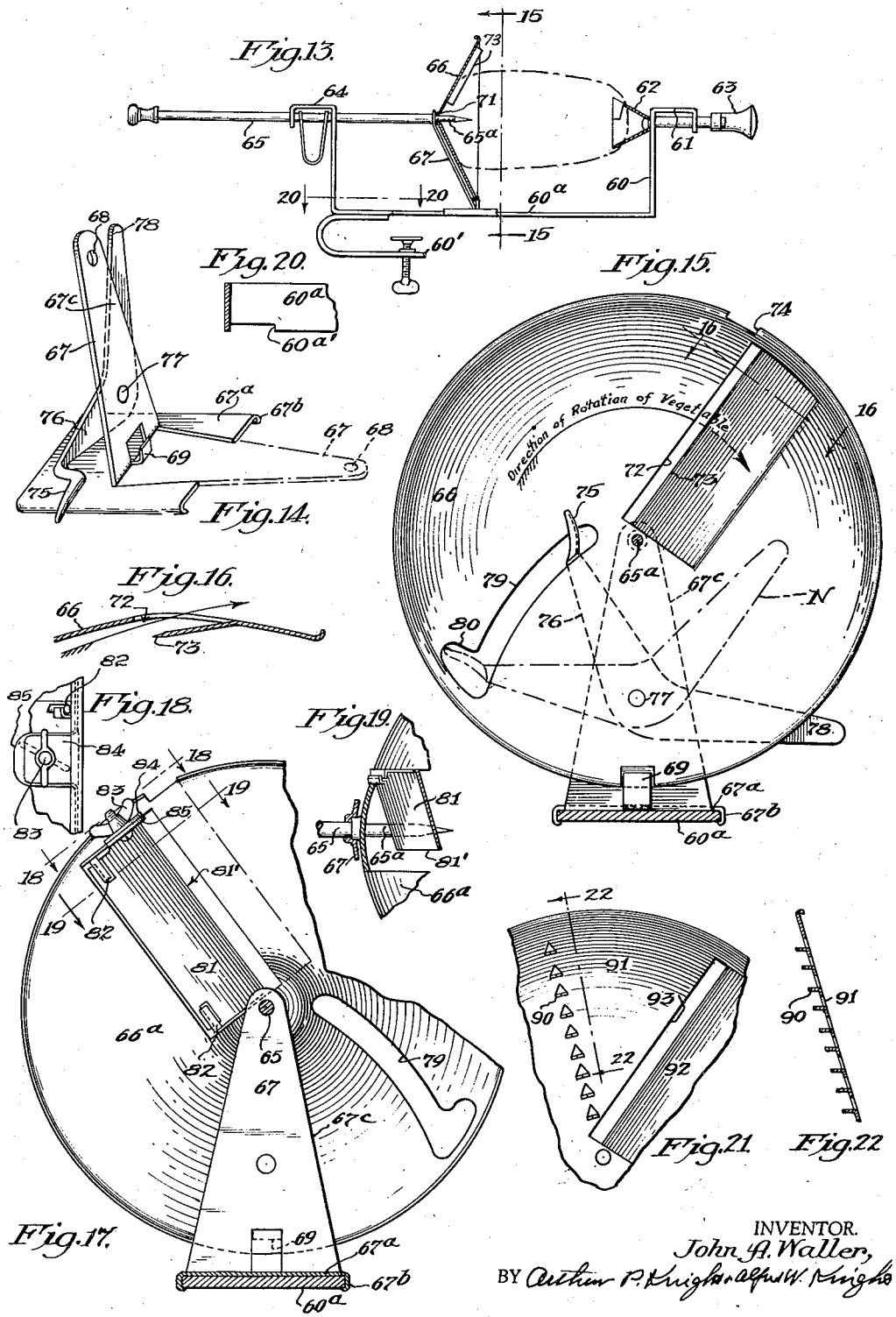

Patented May 2, 1939

2,156,645

UNITED STATES PATENT OFFICE 2,156,645

CULINARY DEVICE

John A. Waller, Beverly Hills, Calif., assignor to American Hardware & Importing Co., Los Angeles, Calif., a corporation of California, and Carl P. Frick, Los Angeles, Calif.

Application July 24, 1937, Serial No. 155,465

8 Claims. (Cl. 146—166)

This invention relates to culinary devices, and pertains particularly to a device for cutting, slicing, and/or peeling certain fruits or vegetables.

The principal object of the invention is to provide a culinary device in which a fruit or vegetable-receiving means is adapted to engage and rotatably support such a fruit or vegetable at each end thereof, one of said receiving means being adapted to impart a rotary motion to such fruit or vegetable, whereby such fruit or vegetable may be subjected to a cutting and/or peeling treatment.

One of the particular objects of the invention is to provide a culinary device having support means adapted to receive a fruit, vegetable or the like, and position the same for rotation about an established axis, and an associated cutting means positioned to engage one end of such fruit or vegetable and effect a progressive removal of portions thereof at said engaged end upon rotation thereof about said axis.

One of the principal objects of the device is to provide for concurrent slicing and peeling of a fruit or vegetable in such manner that the peeling operation progresses with the slicing operation and slightly in advance thereof.

A further object of the invention is to provide a device in which a rotary movement is imparted to a fruit or vegetable under treatment, in a certain desired relation to one or more fixed cutting blades whereby the desired slicing and peeling can be caused to progress as a continuous operation from one end of the vegetable or fruit to the other.

The device is intended for use on fruits and vegetables which have an appreciable bulk, such as apples, pears, potatoes, parsnips, carrots, and the like, and comprises essentially, a rotatable mandrel means adapted to receive one end of the fruit or vegetable and support the same for rotation, and a cooperating supporting means adapted to rotatably engage the other end of said fruit or vegetable and support the same along the axis of rotation of said mandrel means. In its preferred embodiment, the device also comprises a cutting assembly mounted for movement in the direction of the axis of rotation of the aforesaid mandrel, associated with the aforesaid supporting means at the other end of the fruit or vegetable. The device preferably also comprises a peeling mechanism in position to engage the surface portion of the fruit or vegetable under treatment and remove the skin portion thereof during the rotational movement of the vegetable, and adapted to progress along the length of the vegetable as said other end thereof is progressively removed by the cutting assembly.

Other objects of the invention wil be brought out in the ensuing description of certain embodiments thereof, or will be apparent from such description. The accompanying drawings illustrate the invention, and referring thereto:

Fig. 1 is a side elevation of the device, showing the application thereof to the peeling and slicing of a potato;

Fig. 2 is a plan view of the form shown in Fig. 1;

Fig. 3 is a transverse section thereof taken on line 3—3 in Fig. 2, with the potato omitted;

Fig. 4 is a longitudinal vertical section thereof taken on line 4—4 in Fig. 3;

Fig. 4a is a detail of a portion thereof taken on line 4a—4a in Fig. 3;

Fig. 5 is a transverse section of the device taken on line 5—5 in Fig. 2;

Fig. 6 is a detail section taken on line 6—6 in Fig. 1;

Fig. 7 is a further sectional detail thereof taken on line 7—7 in Fig. 1, with the potato omitted;

Fig. 8 is a sectional detail taken on line 8—8 in Fig. 3;

Fig. 9 is a sectional detail taken on line 9—9 in Fig. 2, showing the slicing operation of the device on a potato or other fruit or vegetable;

Fig. 10 is a perspective view of an auxiliary cutting blade which may be employed with the device;

Fig. 11 is a partly broken-away view corresponding to Fig. 3, showing a modified form of guide plate means adapted for grating use;

Fig. 12 is a sectional detail thereof taken on line 12—12 in Fig. 11;

Fig. 13 is a view corresponding generally to Fig. 1, on a somewhat smaller scale, showing a modified form of the invention;

Fig. 14 is a detail of a form of supporting means useful in connection with the construction shown in Fig. 13, in perspective;

Fig. 15 is an enlarged transverse section taken on line 15—15 in Fig. 13;

Fig. 16 is a sectional detail taken on line 16—16 in Fig. 15;

Fig. 17 is a view corresponding to Fig. 5, of a further modified form of the invention;

Fig. 18 is a detail thereof taken on line 18—18 in Fig. 17;

Fig. 19 is a detail thereof taken on line 19—19 in Fig. 17;

Fig. 20 is a detail taken on line 20—20 in Fig. 13;

Fig. 21 is a fragmentary view of a further modified form of cutting element which may be employed in the device; and Fig. 22 is a sectional detail thereof taken on line 22—22 in Fig. 21.

Referring to the drawings, the device is shown as comprising a frame structure 1 provided with adjustable spring clip means 2 to provide for mounting the device on a suitable support 10, such as a table, bread board or the like. The frame structure 1 is provided with a rotatable hollow mandrel 3 at one end, suitably mounted for rotation in a holding yoke 4, and provided with a shaft member 5 carrying a handle member 6. As shown in Figs. 1 and 7 the hollow mandrel member 3 may comprise a cone of metal or the like secured at its smaller end to the shaft 5 and adapted to engage one end of a fruit or vegetable in such manner as to cause the same to rotate therewith. For this purpose, the mandrel may be provided with a plurality of inwardly projecting tooth members 3a which may conveniently be cut from the body of material from which the cone 3 is fabricated.

The cutting blade assembly is carried on a slidable mount 7 adapted for longitudinal sliding movement in the direction of the axis of rotation of the shaft 5 and operable through the agency of a shaft member 8 slidably disposed within a mounting yoke 9 on the other end of the frame structure 1. The shaft 8 is adapted to be inserted through a suitable saddle 11 on the mount 7, and extends through an opening 12 in the supporting means or guiding plate and the cutting blade assembly 13. The portion 8a of the shaft 8 which extends through the opening 12 is preferably of reduced diameter and is provided with a shoulder 8b adapted to engage the rearward edge of the structure 13, whereby the structure 13 including the mount 7 may be moved toward the mandrel 3 through the agency of the shaft 8. A suitable shoulder 14 is provided on the shaft 8 in position to limit the axial movement of said shaft with respect to the saddle 11, so that upon axial movement of the shaft in a direction away from the handle 6, as by manual engagement of the knob or the like 15 provided on the opposite end of the shaft 8, the projection 14 will engage the saddle 11 and the guiding plate and cutting blade assembly 13 and the associated mount 7 will be moved away from the mandrel 3. The mount 7 is provided with a removable attachment to the frame 1, as through the agency of a yoke 7a adapted to engage the bottom portion 1a of said frame structure, as shown more clearly in Figs. 3, 4, and 5, suitable spacing pads 1a' being preferably provided at the respective ends of the frame portion 1a, whereby the yoke 7a is prevented from being dragged along the surface of the support 10. It will be appreciated that any suitable type of connection of the mount 7 to the frame 1 may be employed.

The guiding plate and cutting blade assembly may comprise, essentially, a generally conical shaped member 16, whose apex is directed away from the mandrel 3 and along the axis of rotation of said mandrel, said plate 16 being secured to the mount 7 in any suitable manner as through the agency of suitable rivets such as shown at 17. The plate 16 is provided with a slot 18 extending in a substantially radial direction from adjacent the center of the plate 16 to close proximity to the periphery of the plate. A suitable cutting blade is mounted for sliding movement so as to bring the cutting edge thereof into and out of the slot 18, which construction may comprise a cutting blade 19 slidably disposed upon a projecting portion 21 of the plate 16 exteriorly of the conical surface formed by said plate, and at an acute angle to the aforesaid conical surface. The angular mounting of the blade 19 with respect to the plate 16 provides a minor adjustment of the position of the cutting edge 19a in the direction of the axis of rotation of the mandrel 3, so that the desired vegetable or fruit may be cut into slices of the desired thickness. Fig. 9 illustrates the action of the blade 19, a potato or the like being shown at 21, and a slice 21a being shown in the process of formation. The blade 19 may conveniently be secured to the projection 22 of the plate 16 through the agency of a frictional clamp member 23, as shown more particularly in Figs. 3, 5, and 8.

In the slicing operation, a potato or other fruit or vegetable is placed in the device as at 21, one end thereof being secured to the hollow mandrel 3 by forcing said mandrel into the end as shown in Fig. 1, and the other end of the potato is guided into the conical plate 16. (Where a pointed object such as a carrot is placed in position in the device, the pointed end thereof may be inserted into the hollow portion of the mandrel 3, as will be apparent.) The shaft 8 is provided with a pointed end portion 8a' which is forced into the body of the potato and serves to position the same axially with respect to the plate 16. Thus, the plate 16 and the shaft 8 engage the other end of the potato and cooperate to support the same for rotation about the axis of rotation of the mandrel member.

Upon rotation of the handle 6, axial pressure being applied to the knob 15 to cause the plate 16 and its associated cutting blades to be forced into firm engagement with the potato, the blade 19 will cut into the potato body after the manner shown in Fig. 9 and a continuous spiral slice of the potato will be produced. As the slice is removed from the end of the potato, the plate 16 and its associated elements will follow along the length of the potato (under the axial pressure applied to the knob 15) until the mandrel 3 enters closely into the cone of the plate 16, and the small remaining piece of potato may subsequently be removed from the device and, if desired, discarded. The stroke of the cutter assembly towards the mandrel 3 may conveniently be limited by selection of the proper length of the shaft 8, which, preferably, should be of such length that the knob 15 will engage the mounting yoke 9 before the mandrel 3 engages the plate 16.

The device is preferably also provided with a peeling mechanism adapted to follow along the surface of the potato or other object being operated upon, to remove the peeling therefrom in advance of the cutting blade 19. The peeling device may comprise a blade member 31 disposed interiorly of the cone defined by the plate 16, as shown particularly in Figs. 3 and 4, said cutting blade 31 being mounted on an arm 32 pivotally secured to the plate 16 at an outward extension thereof as shown at 33, said arm 32 being preferably extended outwardly from the main body of the device to provide a handle portion 34. The arm 32 is preferably disposed exteriorly of the cone provided by the plate 16, and a suitable slot 35 is provided in the plate 16 through which the blade 31 is extended. The arm 32 and blade 31 are so arranged that said blade 31 will be positioned for engagement with the periphery of the potato or other object being handled, at a point close to the engagement of such object with the inner surface of the cone provided by the plate 16. Referring particularly to Fig. 4a, the blade 31 is shown in section, said blade being provided with a flat bearing portion 31a adapted to engage the surface 21b of a potato or the like 21, and a cutting portion comprising a raised edge portion 31b adapted to scrape off the skin layer indicated at 21c as the potato body is moved relative to the plate 16 as the slice 21a is produced. The blade 31 acts in a manner comparable to a lathe tool, taking a thin shaving off the periphery of the body under treatment as the body is moved relative to the blade 31 as above described. The blade 31 will follow the slight indentations and irregularities in the surface of the body under treatment, due to the pivotal mounting thereof at 33, and a suitable spring member or the like as shown at 36 is preferably provided to bias the blade 31 into firm engagement with the body under treatment. The blade 31 and its associated arm and handle portions 32 and 34 are subject to inward and outward movement between the positions indicated in full lines and dot-dash lines in Fig. 3, accommodating the same to various diameters of fruits or vegetables to be handled by the device. Where it is not considered necessary or desirable to peel the object under treatment, the blade 31 will be moved to its outermost position as shown in dot-dash lines at A in Fig. 3, and a suitable catch or projection may be provided in the rim portion of the plate 16 as at 37, in position to engage a suitable portion of the blade 31 and maintain the same in its outward position.

The device may also be employed in the production of so-called "shoestring" slices or strips of potatoes or the like, by the provision of a secondary cutting element 40 comprising a plurality of cutting blades interspaced a distance corresponding to the width desired in the "shoestring" strip. This auxiliary cutting device may be of the form shown in Fig. 10, comprising a flat strip portion 41 provided with an opening 42 at one end and with a clip portion 43 at the other end, a suitable number of small blade members or cutting teeth being provided as at 44 along one edge of the portion 41. The cutting teeth 44 are adapted to extend transversely to the plane of the portion 41, and the device is associated with the main cutting blade 19 by withdrawing the shaft portion 8a from the plate 16, placing the auxiliary cutting blade in such position that the cutting teeth 44 extend into the slot 18 provided in the plate, in which position the clip portion 43 extends over the edge of the plate 16, preferably in a suitable notch or the like as shown at 45 in Fig. 5, and the hole 42 is alined with the hole 12 in said plate 16. The shaft 8 is then returned to position, the blade 19 is adjusted so as to produce the desired thickness of slice, and upon rotation of the potato 21 the individual cutting teeth 44 will cut axially into the potato body and a plurality of individual strips will be sliced off as the result of the combined action of the teeth 44 and the blade 19.

When it is desired to peel a potato or the like without slicing the same, the member 13 may be removed from the frame 1 by turning the shaft 8 until the projection 14 is directed upwardly, and then withdrawing the said shaft from the member 13, allowing the projection 14 to pass through the notch 11a in the saddle 11. The member 13 may then be moved bodily toward either end of the frame 1, to a position such that the yoke 7a may be withdrawn from the member 1a through conveniently located notches 51. A potato or the like may then be placed in position upon the mandrel 3, and the shaft 8 pushed toward the other end of the potato until the pointed end portion 8a thereof is caused to enter said other end, at which time the shaft may be located in position by means of an eccentric lock member 52 located at the position of the mounting yoke 9. The action of the eccentric lock member 52 is illustrated in Fig. 6. The handle 6 may then be operated, causing a rotation of the potato, and a suitable scraping device such as a wire brush or the like may be held against the outer surface of the vegetable to secure the desired abrasion of the skin portion.

The device may alternatively be provided with means for "grating" a vegetable or fruit, as by providing a generally conical grating member 55 (see Figs. 11 and 12) comparable in shape to the plate 16, and provided with a plurality of openings 56 formed by punching the metal of the member 55 inwardly (in a direction toward the mandrel 3) to provide inwardly directed cutting or grating members 57 (Fig. 12) in position to engage a vegetable disposed in the relation shown in Figs. 1 and 2. Upon rotation of a vegetable after the manner described in connection with the slicing device, the end portion thereof within the conical member 55 will be scraped or grated away continuously, and, if desired, a peeling member such as shown at 31 through 36 may be provided for the member 55, so as to provide for concurrent removal of the peeling. The member 55 is preferably provided with mounting means comparable to the saddle 11 and the mount 7, as will be apparent, and is preferably removable whereby the member 13 alternatively may be used on the same frame structure.

A somewhat more simple embodiment of the invention is illustrated in Figs. 13 through 16, and 20, and may comprise a frame 60 provided with a base member 60' for attachment of the device to a table or the like, a holding yoke 61 at one end adapted to receive a mandrel 62 and the associated handle means 63 corresponding to the structure shown at 3, 4, and 5 in the first-described form of the invention, and a holding yoke 64 at the other end adapted to receive a shaft member 65 corresponding to the shaft 8 above. The mandrel 62 is adapted to engage and rotatably support the potato or other vegetable or fruit at one end thereof and the shaft 65 is adapted to engage the other end of the object as in the first-described form of the invention, and the cooperating guiding and supporting means may comprise a conically shaped plate member 66 corresponding in position and function to the plate 16 above, removably mounted on a support member 67 slidably disposed on the base portion 60a of the frame 60.

As shown particularly in Fig. 14, the support member 67 may be formed from a single piece of metal, and may comprise a base portion 67a provided with overturned edge portions 67b adapted to engage the lateral edges of the frame base 60a, and an upstanding portion 67c provided with an opening 68 in line with the shaft 65. A clip member 69 is provided adjacent the lower end of the upstanding portion 67c in position to engage the lower edge of the plate 66, after the manner shown in Figs. 13 and 15, said plate 66 being provided with an opening 71 at its apex portion, adapted to be alined with the openings 68 and receive the tip portion 65a of the shaft 65. The plate 66 is slotted as at 72, and a portion of the plate is bent inwardly of the cone defined by said plate to form a cutting blade 73. In this form of device, the cutting blade 73 is relatively fixed with respect to the plate 66 and the slot 72, so that a particular plate 66 is adapted only for producing slices of one thickness. The plate 66 is preferably removable from the device to permit substitution of any one of a number of different plates each providing for the production of slices of different thicknesses, ready removal of the plate 66 from the device being accomplished by withdrawing the shaft portion 65a from the openings 71 and 68, and lifting the plate 66 from the socket provided by the clip 69.

It will be appreciated that an auxiliary cutting member such as that shown in Fig. 10 may be employed with the form of device shown in Figs. 13 through 16, if desired, the clip portion 43 thereof extending over the edge of the plate 66, preferably in a suitable notch or the like as shown at 74 in Fig. 15, in a manner comparable to that shown in dot-dash lines in Fig. 5, with the cutting teeth 44 extending through the slot 72.

The device may advantageously be provided with a peeling element, comparable to the peeling element shown at 31 through 36 in the first-described form of the invention, which element may comprise a cutting blade 75 mounted on a support arm 76 pivotally secured as at 77 to the upstanding portion 67c of the support 67, and extending laterally to one side of the device to form a handle 78. The blade portion 75 is adapted to extend through a suitable slot 79 in the plate 66, corresponding to the slot 35 shown in Figs. 3 and 5, and the lower or outer portion of the slot 79 is preferably enlarged as shown at 80 to provide for removal or insertion of a plate 66 on the device, by passing the blade portion 76 through said slot at the enlarged portion thereof. The peeling element may be spring biased after the manner shown in the first form of the invention and suitable stop means (not shown) are preferably also provided to hold the same in non-peeling position, such as shown in dot-dash lines at N in Fig. 15.

In Figs. 17 through 19 I have illustrated a modified form of cutting assembly, in which a blade member 81 corresponding to the blade 73 is provided with pivotal attachment to the rearward face of the guiding and supporting plate 66a, as at 82, and suitable means are provided for positioning the cutting edge 81' of the blade 81 in position to cut any desired thickness of slice from the fruit or vegetable under treatment. Such means may comprise a thumb-screw locking arrangement 83 mounted on a projecting tab portion 84 formed from the plate 66a and engaging a slotted tab portion 85 formed on the blade member 81.

The support member 67 may be removed from the frame 60, if desired, by providing a notched portion 60a' adjacent one end of the portion 60a of the frame structure, so that when the support 67 is moved to an end position (after withdrawal of the shaft 65), the notch 60a' will allow the support to be lifted away from the portion 60a by allowing the overturned portion 67b of said support to pass. It will be appreciated that a "grating" type of guiding and supporting means may be provided, after the manner shown in Figs. 11 and 12, in connection with a construction patterned after that shown in Figs. 13 through 20, without departing from the spirit of this invention. In like manner the sliding blade construction shown at 19 through 23 in the first-described form of the invention may be incorporated, if desired, in the latter form of invention.

In Figs. 21 and 22 I have illustrated a modified form of cutting means comprising a single element adapted to produce cuttings in the form of "shoestring" potatoes or the like, the showing in Fig. 21 corresponding to a sector of the circular plate 66 shown in Fig. 15 in which a plurality of cutting teeth 90 are provided in the face of a supporting or guide plate 91 corresponding in function to the teeth 44 shown in Fig. 10. Teeth 90 may be formed by punching a triangular section of metal from the face of the plate 91 after the manner shown, said teeth being spaced along a radius of the plate or arranged in any other fashion. The plate 91 is preferably provided with a main cutting blade 92 and a cooperating slot 93, corresponding to the blade and slot structures shown at 73 and 72 respectively in Fig. 15. It will be appreciated that different plates may be provided with different spacing and depth of penetration of the teeth 90, as well as with different settings of the blade 92, in order to accommodate the device to the production of any desired size of fruit or vegetable fragments.

While in the above description the plate means 16, 55, 66, 66a, and 91 are shown as generally conical in shape for the purpose of providing additional support to the outer end of the fruit or vegetable under treatment, it will be appreciated that these plate structures may be made substantially flat, if desired, and the projecting end portion of the shaft 8 (or 65) relied upon to secure the desired support of such outer end.

Other modifications will occur to those skilled in the art, and I do not choose to be limited to the precise forms of invention herein described and delineated, but rather to the scope of the subjoined claims. For example, the secondary cutting member 40 may be so designed that the tooth members 44 will cut into a slice 21a after formation thereof by the blade 19, instead of being such as to precede the blade 19, it being only necessary that the teeth 44 be disposed adjacent the cutting edge 19a of the blade 19 so that the potato or other subject is subjected to the action of both cutting elements.

I claim:

1. A culinary device which comprises: an elongated frame member; a mandrel mounted for rotation on said frame member at one end thereof and substantially fixed against axial movement, said mandrel being adapted to receive one end of a fruit or vegetable in such manner as to cause the same to rotate therewith, and the axis of rotation of said mandrel being directed along the length of said frame member; a shaft member slidably mounted on the other end of said frame member for movement along said axis of rotation and adapted to engage and rotatably support the other end of said fruit or vegetable, the axis of said shaft member being directed substantially along said first-named axis; and guide plate means slidably mounted on said frame member for movement in the direction of said axis and adapted for integral movement with said shaft member, said guide plate means comprising a conically shaped member having its apex directed away from said mandrel and provided with an opening adapted to receive the end of said shaft member, and said guide plate means being provided with cutting means adapted to engage a fruit or vegetable at the end thereof opposite said one end, whereby said cutting means will continuously remove the portions of said fruit or vegetable so engaged, upon rotation of said mandrel.

2. The invention set forth in claim 1, and comprising in addition, peeling blade means pivotally secured to said guide plate means at a point outwardly removed from said apex, said blade means comprising a flat bearing portion adapted to engage the periphery of said fruit or vegetable at a point adjacent said guide plate means and a cutting portion closely adjacent said bearing portion in position to cut into the surface of said fruit or vegetable.

3. The invention set forth in claim 1, said guide plate means being provided with a substantially radially directed slot extending from adjacent the periphery thereof to adjacent the center thereof, and said cutting means comprising a blade member slidably secured to said guide plate means and having a portion constituting a cutting edge extending through said substantially radially directed slot at an acute angle to the conical surface defined thereby.

4. The invention set forth in claim 1, said guide plate means being provided with a substantially radially directed slot extending from adjacent the periphery thereof to adjacent the center thereof, and said cutting means comprising a blade member slidably secured to said guide plate means and having a portion extending through said substantially radially directed slot, said blade member being disposed at an acute angle to the conical surface defined by said guide plate means, and slidable inwardly and outwardly of said slot, and said invention comprising in addition peeling blade means pivotally secured to said guide plate means at a point outwardly removed from said apex, said blade means comprising a flat bearing portion adapted to engage the periphery of said fruit or vegetable at a point adjacent said guide plate means and a cutting portion closely adjacent said bearing portion in position to cut into the surface of said fruit or vegetable.

5. The invention set forth in claim 1, said guide plate means being provided with a substantially radially directed slot extending from adjacent the periphery thereof to adjacent the center thereof, and said cutting means comprising a blade member slidably secured to said guide plate means and having a portion constituting a cutting edge extending through said substantially radially directed slot at an acute angle to the conical surface defined thereby, and comprising in addition, a secondary cutting member disposed in said slot in engagement with said guide plate means, said secondary cutting member being provided with an opening adapted to receive said end of said shaft member in alinement with said opening in said guide plate means, and a plurality of cutting tooth members adjacent the position of said cutting edge and extending substantially in the direction of the axis of rotation of said mandrel.

6. A culinary device which comprises: an elongated frame member; a mandrel mounted for rotation on said frame member at one end thereof and substantially fixed against axial movement, said mandrel being adapted to receive one end of a fruit or vegetable in such manner as to cause the same to rotate therewith, and the axis of rotation of said mandrel being directed along the length of said frame member; a shaft member slidably mounted on the other end of said frame member for movement along said axis of rotation and adapted to engage and rotatably support the other end of said fruit or vegetable, the axis of said shaft member being directed substantially along said first-named axis; a support member slidably mounted on said frame member for movement in the direction of said axis; and guide plate means removably secured to said support member and comprising a conically shaped member having its apex directed away from said mandrel and provided with an opening adapted to receive the end of said shaft member, said guide plate means being provided with cutting means extending substantially radially along said guide plate means from adjacent the center thereof to adjacent the outer periphery thereof, and adapted to engage a fruit or vegetable at the end thereof opposite said one end, whereby said cutting means will continuously remove the portion of said fruit or vegetable so engaged, upon rotation of said mandrel.

7. The invention set forth in claim 6, and comprising in addition peeling blade means pivotally secured to said support member at the side thereof away from said mandrel member and extending through a slot provided in the face of said guide plate, and movable within said slot toward and away from the apex of said guide plate.

8. The invention set forth in claim 6, and comprising in addition peeling blade means pivotally secured to said support member at the side thereof away from said mandrel member and extending through a slot provided in the face of said guide plate, and movable within said slot toward and away from the apex of said guide plate, said blade means comprising a flat bearing portion adapted to engage the periphery of said fruit or vegetable at a point adjacent said guide plate means and a cutting portion closely adjacent said bearing portion in position to cut into the surface of said fruit or vegetable.

JOHN A. WALLER.